United States Patent
Dean

(10) Patent No.: US 11,385,000 B2
(45) Date of Patent: Jul. 12, 2022

(54) SYSTEMS AND METHODS FOR A NON-PRESSURIZED CLOSED LOOP WATER SUB-SYSTEM

(71) Applicant: Emerson Climate Technologies, Inc., Sidney, OH (US)

(72) Inventor: William J. Dean, Greenville, IL (US)

(73) Assignee: Emerson Climate Technologies, Inc., Sidney, OH (US)

( * ) Notice: Subject to any disclaimer, the term of this patent is extended or adjusted under 35 U.S.C. 154(b) by 110 days.

(21) Appl. No.: 17/033,416

(22) Filed: Sep. 25, 2020

(65) Prior Publication Data
US 2022/0099390 A1 Mar. 31, 2022

(51) Int. Cl.
*F28F 13/06* (2006.01)
*F24F 3/147* (2006.01)

(52) U.S. Cl.
CPC .............. *F28F 13/06* (2013.01); *F24F 3/147* (2013.01); *F28F 2255/02* (2013.01)

(58) Field of Classification Search
CPC ......... F28D 9/0087; F28F 13/08; F28F 13/06; F28F 13/00; F28F 2255/02; F24F 3/147; F24F 3/14; F24F 2003/1458; F24F 2003/1435; F24F 1/0003; F24B 25/005
See application file for complete search history.

(56) References Cited

U.S. PATENT DOCUMENTS

| | | | | |
|---|---|---|---|---|
| 3,814,172 A * | 6/1974 | Shore | ...................... | F28F 13/12 165/84 |
| 7,147,071 B2 * | 12/2006 | Gering | ..................... | B60H 1/08 165/41 |
| 8,205,668 B2 * | 6/2012 | Freese, V | .............. | F02M 26/50 165/300 |
| 8,800,308 B2 | 8/2014 | Vandermuelen | | |
| 8,943,850 B2 | 2/2015 | Vandermuelen | | |
| 9,000,289 B2 | 4/2015 | Vandermuelen | | |

(Continued)

FOREIGN PATENT DOCUMENTS

| EP | 3361171 A1 | 8/2018 | |
|---|---|---|---|
| WO | WO-2015163304 A1 * | 10/2015 | .............. F24F 3/147 |
| WO | 2019089967 A1 | 5/2019 | |

OTHER PUBLICATIONS

International Search Report and Written Opinion issued by the International Search Authority regarding PCT/US2021/051251 dated Jan. 7, 2022; pp. 1-14.

*Primary Examiner* — Tho V Duong
(74) *Attorney, Agent, or Firm* — Armstrong Teasdale LLP

(57) ABSTRACT

A heating, ventilation, and air conditioning system includes first and second fluids, a heat exchanger, a refrigerant sub-system, and at least one closed loop sub-system. The heat exchanger includes a membrane for channeling the first fluid through the heat exchanger and is disposed for heat transfer between the first fluid and the second fluid. The membrane defines an inlet having an inlet height relative to grade. The closed loop sub-system transfers heat from the heat exchanger to the refrigerant sub-system and includes an expansion tank containing the first fluid. A level of the first fluid within the expansion tank has a level height relative to grade. The expansion tank is positioned relative to the heat exchanger such that the inlet height is greater than the level height and the membrane is maintained in a collapsed configuration.

20 Claims, 5 Drawing Sheets

(56) References Cited

U.S. PATENT DOCUMENTS

| | | | |
|---|---|---|---|
| 9,109,808 B2 * | 8/2015 | Gerber | ................ F24F 5/0014 |
| 9,243,810 B2 | 1/2016 | Vandermuelen | |
| 9,273,877 B2 | 3/2016 | Vandermuelen | |
| 9,308,490 B2 | 4/2016 | Vandermuelen | |
| 9,377,207 B2 | 6/2016 | Vandermuelen | |
| 9,429,332 B2 | 8/2016 | Vandermuelen | |
| 9,470,426 B2 | 10/2016 | Vandermuelen | |
| 9,631,823 B2 | 4/2017 | Vandermuelen | |
| 9,631,848 B2 | 4/2017 | Vandermuelen | |
| 9,709,285 B2 | 7/2017 | Vandermuelen | |
| 10,024,558 B2 | 7/2018 | Vandermuelen | |
| 10,024,601 B2 | 7/2018 | Vandermuelen | |

* cited by examiner

SYSTEMS AND METHODS FOR A NON-PRESSURIZED CLOSED LOOP WATER SUB-SYSTEM

FIELD

The field of the disclosure relates generally to heating, ventilation, and air conditioning systems and the like, and more particularly, to systems and methods for a non-pressurized, closed loop water sub-system of a heating, ventilation, and air conditioning system.

BACKGROUND

Heating, ventilation, and air conditioning (HVAC) systems may include multiple sub-systems that improve the heating, cooling, and moisture removal capabilities of the HVAC system. For example, HVAC systems may include a refrigerant sub-system, a hot water sub-system, and a cold water sub-system, which improve the efficiency of the HVAC system. Additionally, the HVAC system may also include a heat exchanger having a membrane that channels a flow of heat exchange fluid through the heat exchanger. The heat exchanger enables the HVAC system to exchange heat between multiple heat exchange fluids simultaneous. In order to maintain a predetermined amount of heat transfer between the heat exchange fluids, the membrane is maintained in a collapsed configuration. Specifically, the hot and cold water sub-systems are open, non-pressurized systems to maintain the membrane in the collapsed configuration. However, contaminants may enter the hot and cold water sub-systems, reducing the efficiency of the sub-systems, because the hot and cold water sub-systems are open systems. Improved systems, and related methods, are needed.

This background section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

SUMMARY

In one aspect, a heating, ventilation, and air conditioning system includes first and second fluids, a heat exchanger, a refrigerant sub-system, and at least one closed loop sub-system. The heat exchanger includes a membrane for channeling the first fluid through the heat exchanger and is disposed for heat transfer between the first fluid and the second fluid. The membrane defines an inlet having an inlet height relative to grade. The closed loop sub-system transfers heat from the heat exchanger to the refrigerant sub-system and includes an expansion tank containing the first fluid. A level of the first fluid within the expansion tank has a level height relative to grade. The expansion tank is positioned relative to the heat exchanger such that the inlet height is greater than the level height and the membrane is maintained in a collapsed configuration.

In another aspect, a closed loop sub-system for a heating, ventilation, and air conditioning system including first and second fluids includes a heat exchanger and an expansion tank. The heat exchanger includes a membrane for channeling the first fluid through the heat exchanger. The membrane is disposed for heat transfer between the first fluid and the second fluid. The membrane defines an inlet having an inlet height relative to grade. The expansion tank contains the first fluid. A level of the first fluid within the expansion tank has a level height relative to grade. The expansion tank is positioned relative to the heat exchanger such that the inlet height is greater than the level height and the membrane is maintained in a collapsed configuration.

In yet another aspect, a method of transferring heat from a refrigerant loop of a heating, ventilation, and air conditioning (HVAC) system to a heat exchanger of the HVAC system using a closed loop sub-system includes channeling a first fluid from a membrane of the heat exchanger to an expansion tank. The HVAC system includes first and second fluids, the sub-system includes the expansion tank, and the heat exchanger includes the membrane. The membrane defines an inlet having an inlet height relative to grade. A level of the first fluid within the expansion tank has a level height relative to grade. The method also includes channeling the first fluid from the expansion tank to the membrane. The expansion tank is positioned relative to the heat exchanger such that the inlet height is greater than the level height and the membrane is maintained in a collapsed configuration. The method further includes exchanging heat from the first fluid to the second fluid using the membrane.

Various refinements exist of the features noted in relation to the above-mentioned aspects. Further features may also be incorporated in the above-mentioned aspects as well. These refinements and additional features may exist individually or in any combination. For instance, various features discussed below in relation to any of the illustrated embodiments may be incorporated into any of the above-described aspects, alone or in any combination.

BRIEF DESCRIPTION OF THE DRAWINGS

Corresponding reference characters indicate corresponding parts throughout the drawings.

DETAILED DESCRIPTION

Figure 1:
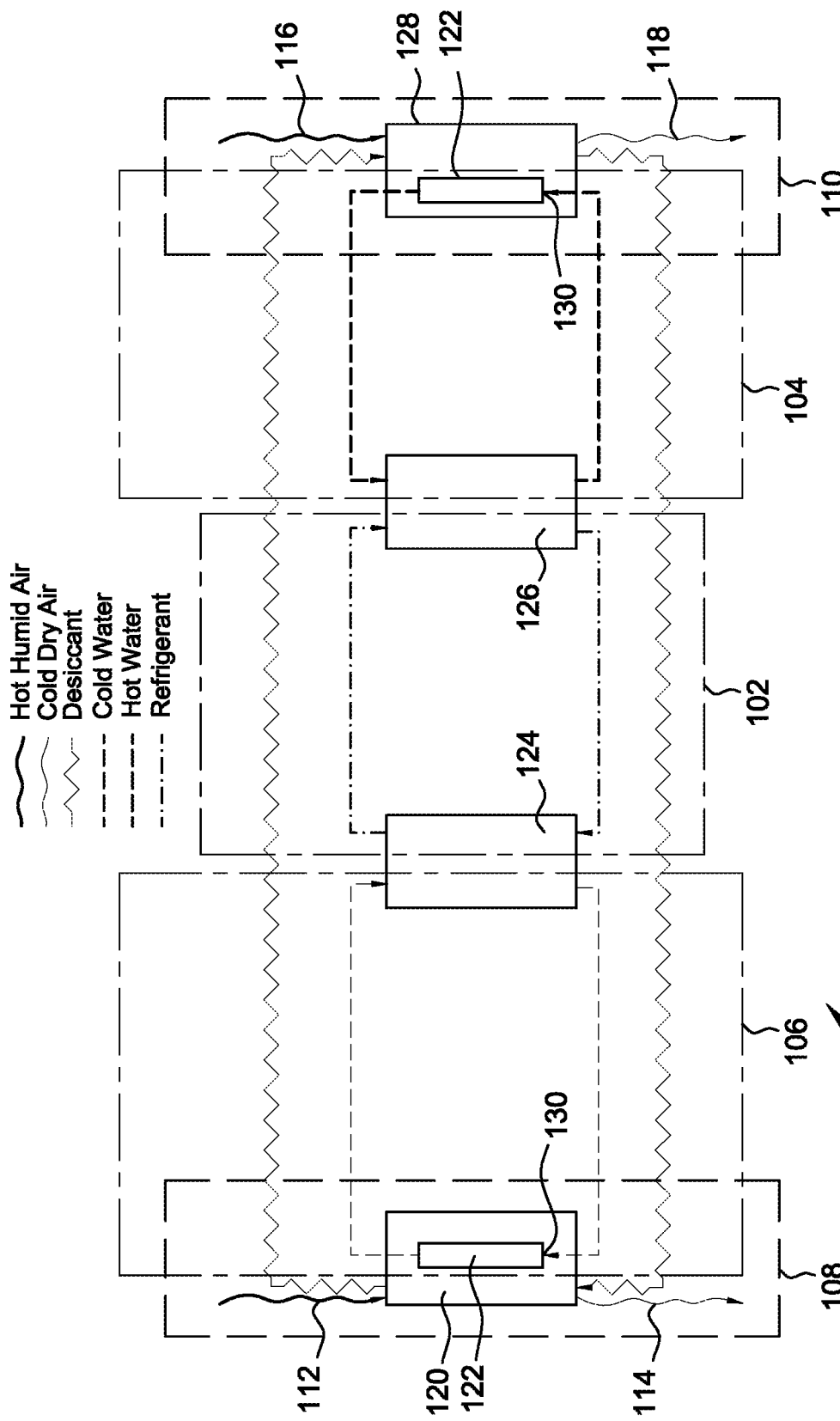
FIG. 1 is a schematic flow diagram of a heating, ventilation, and air conditioning (HVAC) system.

FIG. 1 is a schematic flow diagram of a heating, ventilation, and air conditioning (HVAC) system 100. While the HVAC system 100 may be any type of HVAC system, the HVAC system 100 is more efficient than prior HVAC systems because the HVAC system 100 includes sub-systems 102-110 which improve the heating, cooling, and moisture removal capabilities of system 100 when compared to prior systems. Specifically, the HVAC system 100 includes a refrigerant sub-system 102, two water sub-systems 104 and 106, a conditioning sub-system 108, and a regeneration sub-system 110. The water sub-systems 104 and 106 include a hot water sub-system 104 and a cold water sub-system 106. The conditioning sub-system 108 removes heat and moisture from a flow of conditioning inlet air 112 and channels a flow of conditioning outlet air 114 to a structure or vehicle (not shown). The flow of conditioning outlet air 114 has a lower temperature and humidity than the flow of conditioning inlet air 112 because the conditioning sub-system 108 has removed heat and moisture from the air. The sub-systems 102-110 transfer the heat and moisture from the conditioning sub-system 108 to the regeneration sub-system 110. The regeneration sub-system 110 transfers the heat and moisture into a flow of regeneration inlet air 116 and channels a flow of regeneration outlet air 118 to the atmosphere.

The conditioning sub-system 108 shares a first heat exchanger 120 with the cold water sub-system 106 and the regeneration sub-system 110 and interfaces with the cold water sub-system and the regeneration sub-system through the first heat exchanger. In this embodiment, the first heat exchanger 120 is a 3-way heat exchanger that transfers heat from the flow of conditioning inlet air 112 to a flow of a first fluid and a transfers heat and moisture from the flow of conditioning inlet air 112 to a flow of a second fluid. The first heat exchanger 120 includes a moisture membrane (not shown) that permits both heat and moisture to be transferred from the flow of conditioning inlet air 112 to the flow of the second fluid and a membrane 122 that channels the flow of the first fluid through the first heat exchanger 120 and transfers heat from the flow of conditioning inlet air 112 and the flow of the second fluid to the flow of the first fluid. In the illustrated embodiment, the flow of the first fluid is a flow of water circulated by the cold water sub-system 106, and the flow of the second fluid is a flow of a liquid desiccant circulated by the conditioning sub-system 108 and the regeneration sub-system 110. In alternative embodiments, the first fluid may be any fluid that enables the conditioning sub-system 108 and the cold water sub-system 106 to operate as described herein, and the second fluid may be any fluid that enables the conditioning sub-system 108 and the regeneration sub-system 110 to operate as described herein. As described below, the cold water sub-system 106 is a non-pressurized, closed loop sub-system that enables the first heat exchanger 120 to include non-pressurized elements, which enables the first heat exchanger to exchange heat between the flow of conditioning inlet air 112, the first fluid, and the second fluid.

The cold water sub-system 106 shares the first heat exchanger 120 with the conditioning sub-system 108 and shares an evaporator 124 with the refrigerant sub-system 102. As described below, the cold water sub-system 106 transfers heat from the first heat exchanger 120 to the evaporator 124 or to the atmosphere. More specifically, the cold water sub-system 106 may include additional heat transfer equipment that transfers heat to the atmosphere. The remainder of the heat is transferred to the refrigerant sub-system 102 through the evaporator 124. Additionally, the cold water sub-system 106 is a non-pressurized, closed system that does not permit material from the surrounding environment to enter the sub-system, preventing contaminates from entering the sub-system and contaminating the sub-system. As used herein, non-pressurized means that the sub-system operates at 5 pounds per square inch gauge pressure (psig) or less.

The refrigerant sub-system 102 shares the evaporator 124 with the cold water sub-system 106 and shares a condenser 126 with the hot water sub-system 104. The refrigerant sub-system 102 may also include an expansion valve (not shown) and a compressor (not shown). The refrigerant sub-system 102 transfers heat from the evaporator 124 to the condenser 126, and the condenser 126 transfers heat to the hot water sub-system 104. Specifically, the refrigerant sub-system 102 channels a flow of a third fluid from the evaporator 124 to the condenser 126, and the third fluid transfers the heat from the evaporator 124 to the condenser 126. In this embodiment, the third fluid is a refrigerant. In alternative embodiments, the third fluid may be any fluid that enables the refrigerant sub-system 102 to operate as described herein.

The hot water sub-system 104 shares a second heat exchanger 128 with the regeneration sub-system 110 and shares the condenser 126 with the refrigerant sub-system 102. As described below, the hot water sub-system 104 transfers heat from the condenser 126 to the second heat exchanger 128 or to the atmosphere. More specifically, the hot water sub-system 104 may include additional heat transfer equipment that transfers heat to the atmosphere. The remainder of the heat is transferred to regeneration sub-system 110 through the second heat exchanger 128. Additionally, the hot water sub-system 104 is a non-pressurized, closed system that does not permit material from the surrounding environment to enter the sub-system, preventing contaminates from entering the sub-system and contaminating the sub-system. As used herein, non-pressurized means that the sub-system operates at 5 psig or less.

The regeneration sub-system 110 shares the second heat exchanger 128 with the hot water sub-system 104 and the conditioning sub-system 108 and interfaces with the hot water sub-system and the conditioning sub-system through the second heat exchanger. In this embodiment, the second heat exchanger 128 is a 3-way heat exchanger that transfers heat from a flow of a first fluid to the flow of regeneration inlet air 116 and a transfers heat and moisture from a flow of a second fluid to the flow of regeneration inlet air 116. The second heat exchanger 128 includes a moisture membrane (not shown) that permits both heat and moisture to be transferred from the flow of a second fluid to the flow of regeneration inlet air 116 and a membrane 122 that channels the flow of the first fluid through the second heat exchanger 128 and transfers heat from the flow of the first fluid to the flow of regeneration inlet air 116 and the flow of the second fluid. In the illustrated embodiment, the flow of the first fluid is a flow of water circulated by the hot water sub-system 104, and the flow of the second fluid is a flow of a liquid desiccant circulated by the conditioning sub-system 108 and the regeneration sub-system 110. In alternative embodiments, the first fluid may be any fluid that enables the regeneration sub-system 110 and the hot water sub-system 104 to operate as described herein, and the second fluid may be any fluid that enables the regeneration sub-system 110 and the conditioning sub-system 108 to operate as described herein. As described below, the hot water sub-system 104 is a non-pressurized, closed loop sub-system that enables the second heat exchanger 128 to include non-pressurized elements, which enables the second heat exchanger to exchange heat between the flow of regeneration inlet air 116, the first fluid, and the second fluid.

Still with reference to FIG. 1, the first heat exchanger 120 and the second heat exchanger 128 are substantially the same. In alternative embodiments, the first heat exchanger 120 and the second heat exchanger 128 are different. Specifically, in this embodiment, both the first heat exchanger 120 and the second heat exchanger 128 include the membrane 122 for channeling the flow of the first fluid through the heat exchangers and for exchanging heat between the first fluid, the second fluid, and a flow of air. In one embodiment, the membrane 122 is a non-rigid, flexible material that permits heat transfer into and out of the first fluid while preventing the first fluid from mixing with any other fluid, including the second fluid and the flow of air.

Specifically, the membrane 122 is a non-rigid, flexible material that is designed to be non-pressurized (operate at or below 5 psig) and is not designed to operate at a substantially greater pressure (e.g., 10 psig). More specifically, in this embodiment, the membrane 122 includes a bladder or polymer sack that permits heat transfer into and out of the first fluid while preventing the first fluid from mixing with any other fluid, including the second fluid and the flow of air and operates at or below 5 psig. The membrane 122 is flexible because the material that forms the membrane is capable of bending without breaking and the membrane is non-rigid because the membrane is capable of changing size and shape without breaking. As discussed below, in this embodiment, the membrane 122 is flexible and non-rigid because the membrane is maintained in a collapsed configuration. In alternative embodiments, the membrane 122 is formed of any material and has any degree of flexibility and rigidity that enables the first heat exchanger 120 and the second heat exchanger 128 to operate as described herein.

The membrane 122 is filled with the first fluid and is positioned proximate the second fluid and the flow of air within the first and second heat exchangers 120 and 128. In some embodiments, the membrane 122 physically contacts at least one of the second fluid and the flow of air to promote enhanced heat transfer between the first fluid, the second fluid, and the flow of air. For example, the membrane 122 may be immersed in the flow of the second fluid and/or the flow of air to promote enhanced heat transfer between the first fluid, the second fluid, and the flow of air. The first heat exchanger 120 and the second heat exchanger 128 are non-pressurized heat exchangers because they include non-pressurized elements (the membrane 122) and portions of the heat exchangers are designed to be non-pressurized (operate at or below 5 psig).

To promote enhanced heat transfer between the first fluid, the second fluid, and the flow of air, the membrane 122 is maintained in the collapsed configuration during operation of the first and second heat exchangers 120 and 128. The collapsed configuration increases a surface area to volume ratio of the membrane 122, increasing the heat transfer coefficient and increasing overall heat transfer between the first fluid, the second fluid, and the flow of air. If the membrane 122 is filled with the first fluid such that the membrane expands like a balloon, a portion of the first fluid interior to the balloon-like membrane is not proximate the second fluid and/or the flow of air, reducing heat exchange between the interior portion of the first fluid and the second fluid and/or the flow of air. However, if the membrane 122 is maintained in a collapsed configuration, all of the first fluid within the membrane is proximate the second fluid and/or the flow of air, increasing heat exchange between the first fluid and the second fluid and/or the flow of air. As described below, the water sub-systems 104 and 106 are arranged and operated to maintain the membrane 122 in the collapsed configuration. More specifically, the water sub-systems 104 and 106 are arranged and operated to be non-pressurized to maintain an inlet 130 of the first and second heat exchangers 120 and 128 at a negative pressure, maintaining the membrane 122 in the collapsed configuration.

Figure 2:
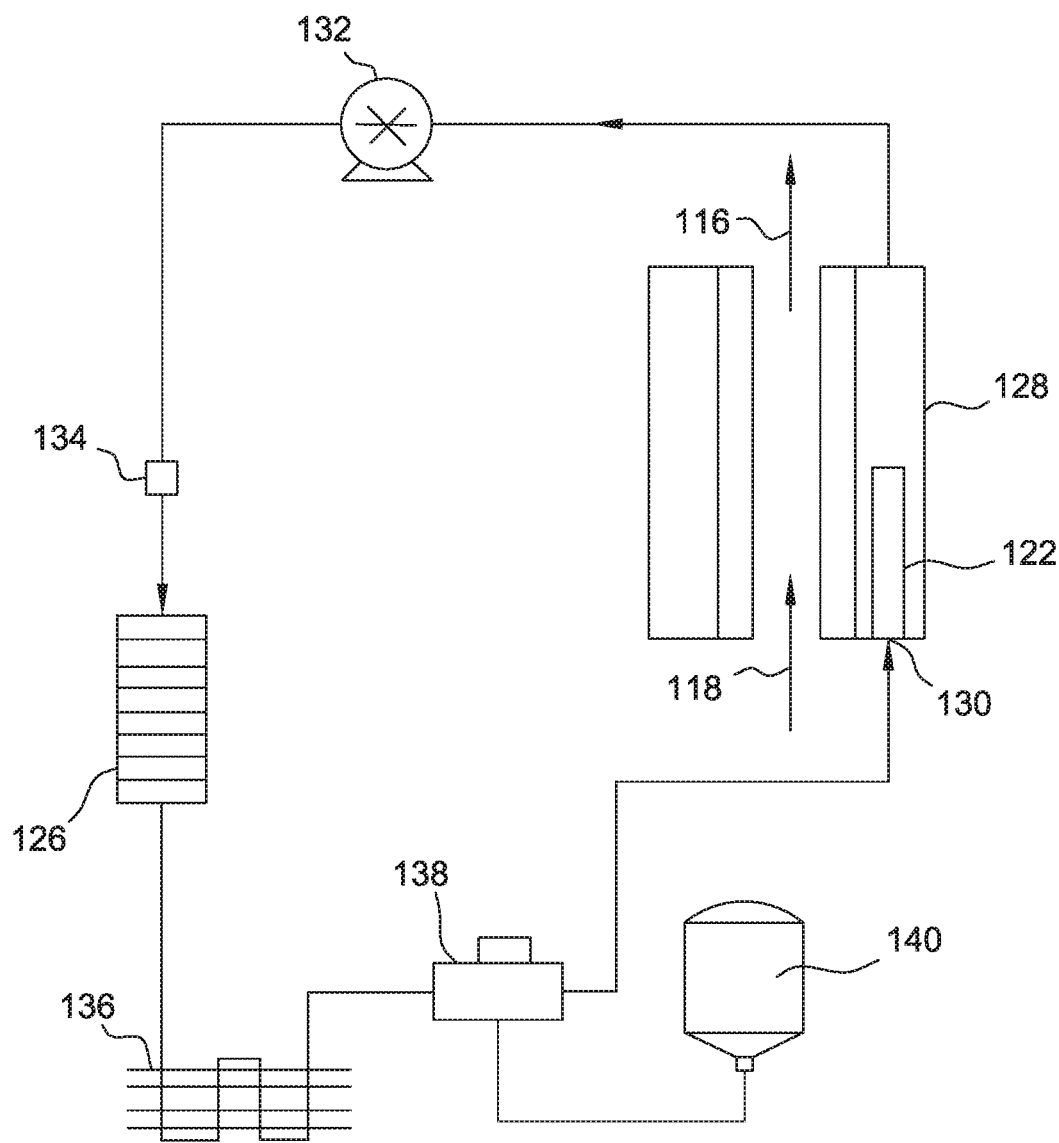
FIG. 2 is a schematic flow diagram of a hot water sub-system illustrated in FIG. 1.

FIG. 2 is a schematic flow diagram of the hot water sub-system 104. The hot water sub-system 104 includes the second heat exchanger 128, the condenser 126, a first pump 132, a first air-first fluid heat exchanger 134, a second air-first fluid heat exchanger 136, a first air scoop 138, and a first expansion tank 140. In this embodiment, the first pump 132 is a centrifugal pump that receives the flow of the first fluid from the second heat exchanger 128 and pumps the first fluid to the condenser 126, the first air-first fluid heat exchanger 134, the second air-first fluid heat exchanger 136, the first air scoop 138, and the first expansion tank 140. However, in alternative embodiments, the pump 136 may be any type of pump that enables the hot water sub-system 104 to operate as described herein. Additionally, the first and second air-first fluid heat exchangers 134 and 136 may be any type of heat exchanger that transfers heat from the first fluid to a flow of air.

In the illustrated embodiment, the first air scoop 138 is an air eliminator positioned downstream of the condenser 126, the first air-first fluid heat exchanger 134, and the second air-first fluid heat exchanger 136. Air may be entrained in the first fluid (water), and the entrained air may cause operational issues for the heat exchangers 128, 134, and 136 and the first pump 132. The first air scoop 138 removes entrained air within the first fluid, improving the operation of the hot water sub-system 104. Additionally, the first air scoop 138 is coupled to the first expansion tank 140 and includes an inlet that enables an operator to add or fill the hot water sub-system 104 with the first fluid.

Figure 3:
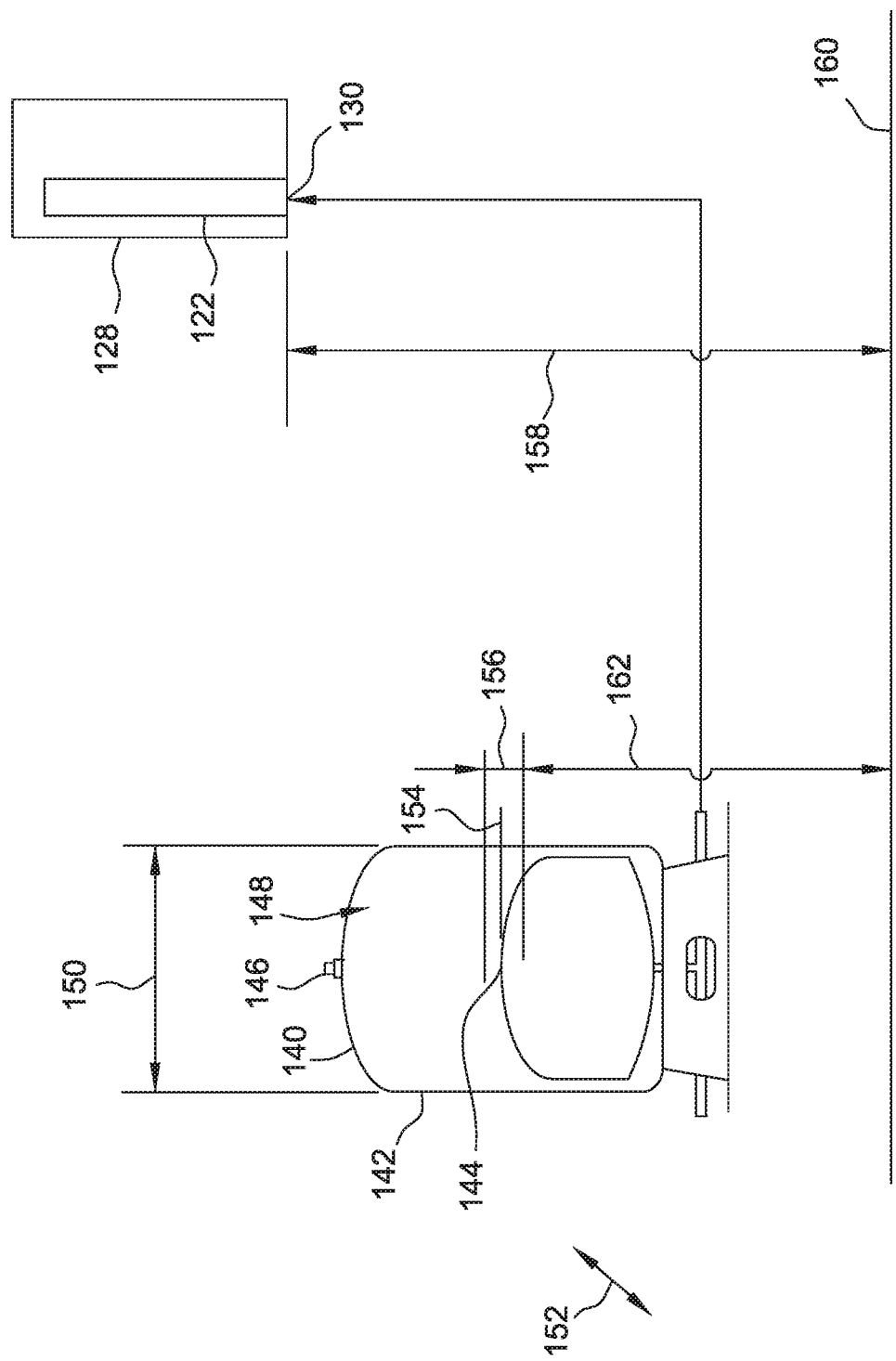
FIG. 3 is a schematic diagram of a first expansion tank and a second heat exchanger illustrated in FIG. 2.

FIG. 3 is a schematic diagram of the first expansion tank 140 and the second heat exchanger 128 illustrating the positions of the first expansion tank relative to the second heat exchanger. The first expansion tank 140 includes a shell 142 and a bladder 144 positioned within the shell. The bladder 144 includes a flexible bladder or polymer sack that contains the first fluid. The shell 142 defines a hole 146 that enables fluid communication between an interior 148 of the shell and the atmosphere. The hole 146 maintains the interior 148 of the shell 142 at atmospheric pressure. Additionally, because the bladder 144 is flexible, the bladder and the first fluid within the bladder are also maintained at atmospheric pressure. Additionally, the shell 142 has a width 150 and a length 152 that maintain a level 154 of the first fluid within the bladder 144 within a predetermined range 156. Specifically, the width 150 and the length 152 are determined such that changes in the volume of the first fluid within the hot water sub-system 104 due to temperature changes do not cause the level 154 of the first fluid within the bladder 144 to exceed or fall below the predetermined range 156.

As shown in FIG. 3, the inlet 130 of the second heat exchanger 128 is positioned at an inlet height 158 relative to grade 160, and the predetermined range 156 is positioned at a range height 162 relative to grade 160. The inlet height 158 is greater than the range height 162 such that the inlet 130 of the second heat exchanger 128 is maintained above (or higher than) the level 154 of the first fluid within the bladder 144. That is, the range height 162 is less than the inlet height 158 such that the level 154 of the first fluid within the bladder 144 is maintained below (or lower than) the inlet 130 of the second heat exchanger 128. Additionally, the first fluid is channeled from the bladder 144 to the membrane 122. Because the level 154 of the first fluid within the bladder 144 is maintained below (or lower than) the inlet 130 of the second heat exchanger 128, a pressure of the inlet of the second heat exchanger is maintained at a negative pressure. The negative pressure causes the membrane 122 to collapse into the collapsed configuration, increasing the heat transfer coefficient and increasing overall heat transfer between the first fluid, the second fluid, and the flow of air. Accordingly, the relative positions of the first expansion tank 140 and the second heat exchanger 128 maintain the membrane 122 in the collapsed configuration. More specifically, the relative positions of the level 154 of the first fluid within the bladder 144 and the inlet 130 of the second heat exchanger 128 cause the pressure of the inlet of the second heat exchanger to be maintained at a negative pressure and maintain the membrane 122 in the collapsed configuration. Additionally, the bladder 144 enables the hot water sub-system 104 to be a non-pressurized, closed system while enabling the first fluid within the bladder to be maintained at atmospheric pressure.

The hole 146 maintains the first fluid within the bladder 144 at atmospheric pressure, and the bladder 144 prevents contaminates from entering the hot water sub-system 104 while allowing the first fluid within the bladder to be maintained at atmospheric pressure. The combination of the bladder 144, the hole 146, and the arrangement of the inlet height 158 relative to the level 154 of the first fluid within the bladder 144 enables the hot water sub-system 104 to maintain the pressure of the inlet 130 of the second heat exchanger 128 at a negative pressure. The negative pressure of the inlet 130 of the second heat exchanger 128 enables the membrane 122 to be maintained in the collapsed configuration and enables the second heat exchanger 128 to include non-pressurized elements. The combination of the bladder 144, the hole 146, and the arrangement of the inlet height 158 relative to the level 154 of the first fluid within the bladder 144 enables the hot water sub-system 104 to maintain the pressure of the inlet 130 of the second heat exchanger 128 at a negative pressure, enabling the inclusion of non-pressurized elements within the second heat exchanger 128. Moreover, maintaining the inlet 130 of the second heat exchanger 128 at a negative pressure maintains the membrane 122 in the collapsed configuration, increasing the surface area to volume ratio of the membrane, increasing the heat transfer coefficient, and increasing overall heat transfer between the first fluid, the second fluid, and the flow of air.

In alternative embodiments, rather than arranging the second heat exchanger 128 and the first expansion tank 140 to maintain the membrane 122 in the collapsed configuration, the hot water sub-system 104 includes additional equipment that maintains the inlet 130 of the second heat exchanger 128 at a negative pressure. For example, the hot water sub-system 104 may include fluid motive devices (e.g. a pump) or pipe fittings (e.g. orifice plates) that maintain the inlet 130 of the second heat exchanger 128 at a negative pressure. The hot water sub-system 104 may include any equipment that enables the sub-system to be a closed system while also maintaining the inlet 130 of the second heat exchanger 128 at a negative pressure.

Figure 4:
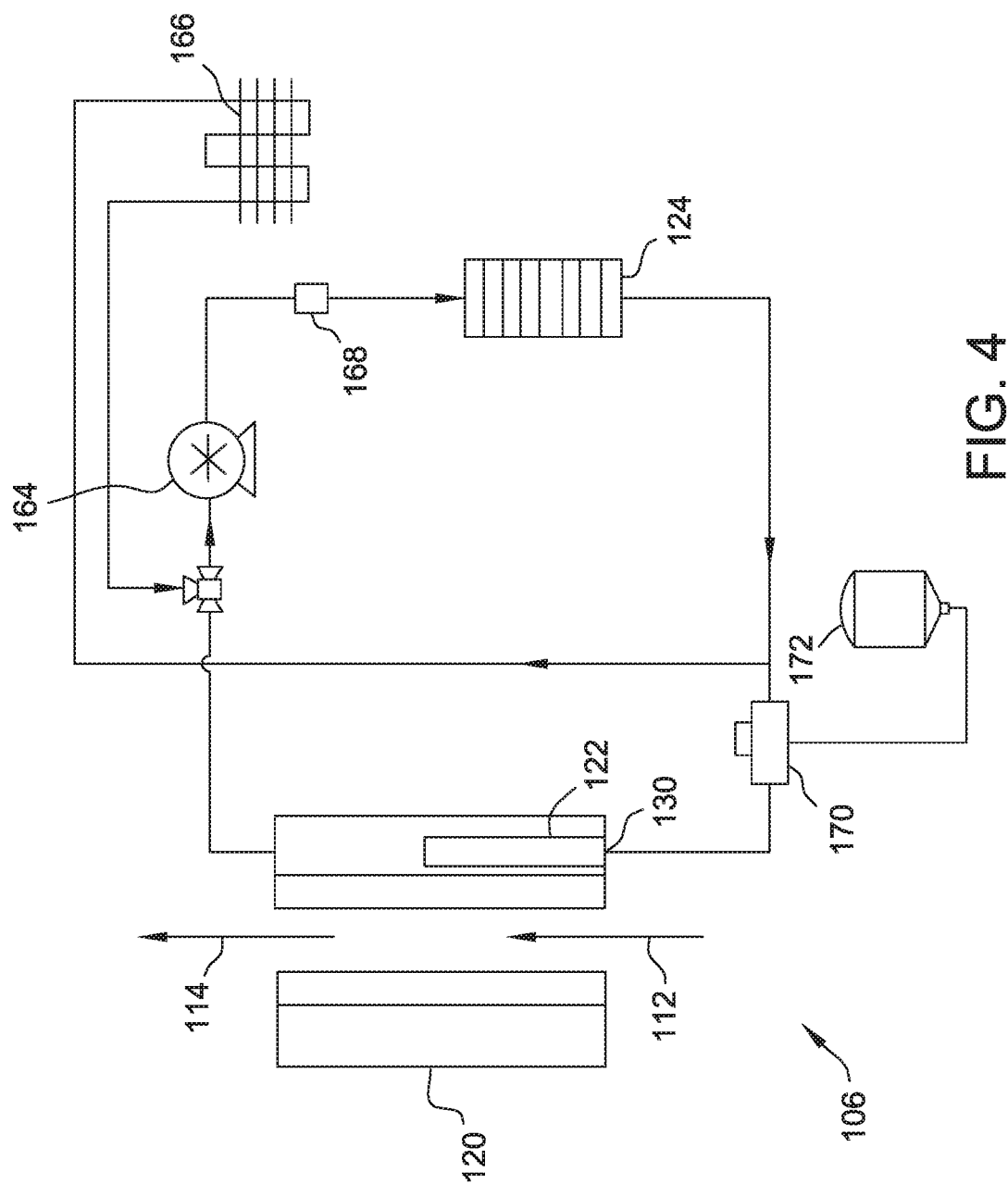
FIG. 4 is a schematic flow diagram of a cold water sub-system illustrated in FIG. 1.

FIG. 4 is a schematic flow diagram of the cold water sub-system 106. The cold water sub-system 106 includes the first heat exchanger 120, the evaporator 124, a second pump 164, a third air-first fluid heat exchanger 166, a fourth air-first fluid heat exchanger 168, a second air scoop 170, and a second expansion tank 172. The cold water sub-system 106 operates in a substantially similar manner as the hot water sub-system 104. Specifically, the cold water sub-system 106 is a closed system and the second expansion tank 172 and the first heat exchanger 120 are arranged to maintain the membrane 122 in the first heat exchanger 120 in the collapsed configuration as described above.

Figure 5:
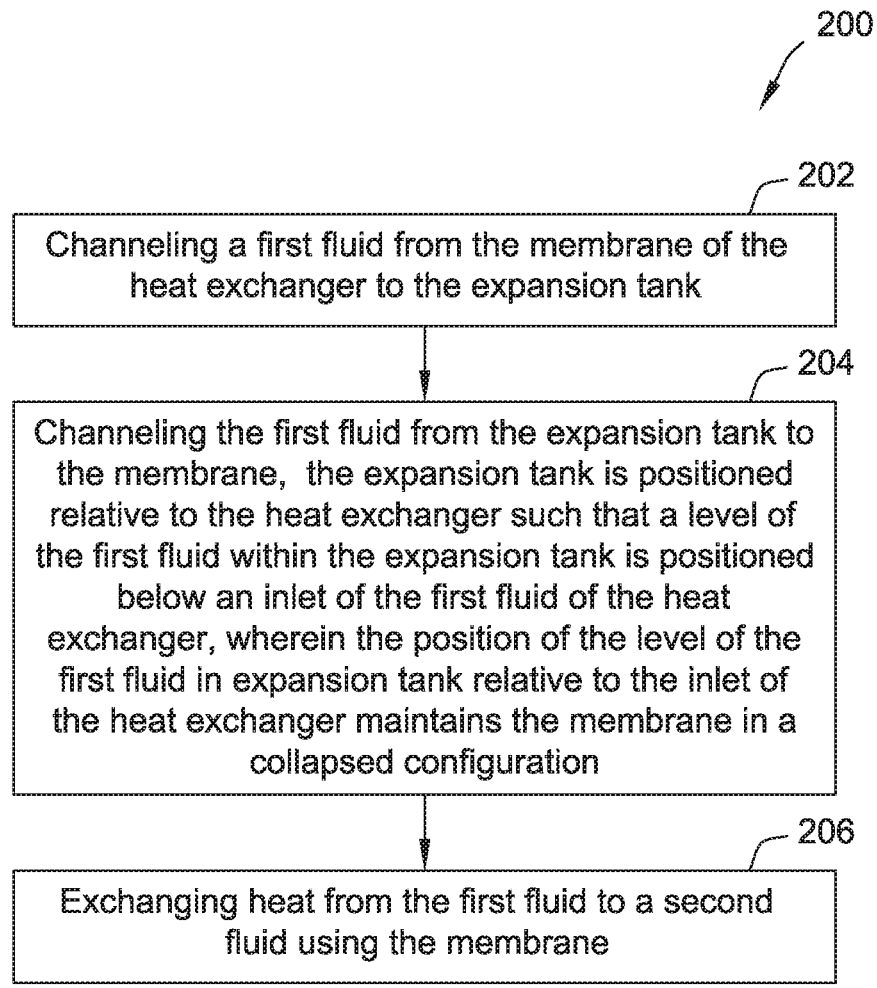
FIG. 5 is a flow diagram of a method of transferring heat from a refrigerant loop to a heat exchanger using the closed loop water sub-system illustrated in FIGS. 2 and 4.

FIG. 5 is a flow diagram of a method 200 of transferring heat from a refrigerant loop of a HVAC system to a heat exchanger of the HVAC system using a closed loop water sub-system. The sub-system includes an expansion tank and the heat exchanger includes a membrane. The method 200 includes channeling 202 a first fluid from the membrane of the heat exchanger to the expansion tank. The method 200 also includes channeling 204 the first fluid from the expansion tank to the membrane. The expansion tank is positioned relative to the heat exchanger such that a level of the first fluid within the expansion tank is positioned below an inlet of the first fluid of the heat exchanger. The position of the level of the first fluid in the expansion tank relative to the inlet of the heat exchanger maintains the membrane in a collapsed configuration. The method 200 further includes exchanging 206 heat from the first fluid to a second fluid using the membrane.

The HVAC systems described herein include multiple sub-systems for removing heat and moisture from a flow of air. Specifically, the HVAC systems include a refrigerant sub-system, a hot water sub-system, and a cold water sub-system, which improve the efficiency of the HVAC systems. The hot and cold water sub-systems are non-pressurized, closed systems to prevent contaminates from entering the sub-systems. The HVAC systems also include a heat exchanger having a membrane that channels a flow of heat exchange fluid through the heat exchanger. The heat exchanger enables the HVAC system to exchange heat between multiple heat exchange fluids simultaneous. In order to maintain a predetermined amount of heat transfer between the heat exchange fluids, the membrane is maintained in a collapsed configuration. Equipment within the hot and cold water sub-systems is arranged to maintain the membrane in the collapsed configuration. Specifically, the hot and cold water sub-systems each include an expansion tank including a shell and a bladder. The shell defines a hole that exposes an interior of the shell and the bladder to the environment and maintains the fluid within the bladder at atmospheric pressure. The bladder prevents contaminates from entering the system, closing the sub-system, while allowing the fluid within the bladder to be maintained at atmospheric pressure. The shell is sized and shaped to maintain a level of the fluid within the bladder within a predetermined range. The expansion tank and the heat exchanger are positioned such that an inlet of the membrane is positioned above the predetermined range. Thus, the inlet of the membrane is maintained at a negative pressure and the membrane is maintained in the collapsed configuration. Accordingly, the HVAC systems described herein include non-pressurized, closed sub-systems while also maintaining the membrane in the collapsed configuration.

Example embodiments of HVAC systems and methods of operating the systems are described above in detail. The systems and methods are not limited to the specific embodiments described herein, but rather, components of the system and methods may be used independently and separately from other components described herein. For example, the systems described herein may be used in systems other than HVAC systems.

When introducing elements of the present disclosure or the embodiment(s) thereof, the articles "a", "an", "the" and "said" are intended to mean that there are one or more of the elements. The terms "comprising," "including," "containing" and "having" are intended to be inclusive and mean that there may be additional elements other than the listed elements. The use of terms indicating a particular orientation (e.g., "top", "bottom", "side", etc.) is for convenience of description and does not require any particular orientation of the item described.

As various changes could be made in the above constructions and methods without departing from the scope of the disclosure, it is intended that all matter contained in the above description and shown in the accompanying drawing(s) shall be interpreted as illustrative and not in a limiting sense.

What is claimed is:

1. A heating, ventilation, and air conditioning (HVAC) system including first and second fluids, the HVAC system comprising:
    a heat exchanger including a membrane for channeling the first fluid through the heat exchanger, the membrane disposed for heat transfer between the first fluid and the second fluid, the membrane defining an inlet having an inlet height relative to grade;
    a refrigerant sub-system; and
    at least one closed loop sub-system for transferring heat from the heat exchanger to the refrigerant sub-system, the closed loop sub-system comprising:
        an expansion tank containing the first fluid, a level of the first fluid within the expansion tank has a level height relative to grade, wherein the expansion tank is positioned relative to the heat exchanger such that the inlet height is greater than the level height and the membrane is maintained in a collapsed configuration.

2. The HVAC system of claim 1, wherein the expansion tank is positioned relative to the heat exchanger such that a pressure of the inlet of the membrane is maintained at a negative pressure.

3. The HVAC system of claim 1, wherein the expansion tank includes a shell and a bladder positioned within the shell.

4. The HVAC system of claim 3, wherein a length and a width of the shell are configured to maintain the level of the first fluid within the bladder within a predetermined range.

5. The HVAC system of claim 3, wherein the shell defines a hole such that an interior of the shell and the first fluid within the bladder are exposed to the environment and are maintained at atmospheric pressure.

6. The HVAC system of claim 1, wherein the membrane is a flexible membrane.

7. The HVAC system of claim 1, wherein the membrane is a non-rigid membrane.

8. The HVAC system of claim 1, wherein the expansion tank is positioned relative to the heat exchanger such that a pressure of an inlet of the membrane is maintained at a negative pressure.

9. A closed loop sub-system for a heating, ventilation, and air conditioning (HVAC) system including first and second fluids, the sub-system comprising:
    a heat exchanger including a membrane for channeling the first fluid through the heat exchanger, the membrane disposed for heat transfer between the first fluid and the second fluid, the membrane defining an inlet having an inlet height relative to grade; and
    an expansion tank containing the first fluid, a level of the first fluid within the expansion tank has a level height relative to grade, wherein the expansion tank is positioned relative to the heat exchanger such that the inlet height is greater than the level height and the membrane is maintained in a collapsed configuration.

10. The sub-system of claim 9, wherein the expansion tank is positioned relative to the heat exchanger such that a pressure of the inlet of the membrane is maintained at a negative pressure.

11. The sub-system of claim 9, wherein the expansion tank includes a shell and a bladder positioned within the shell.

12. The sub-system of claim 11, wherein a length and a width of the shell are configured to maintain the level of the first fluid within the bladder within a predetermined range.

13. The sub-system of claim 11, wherein the shell defines a hole such that an interior of the shell and the first fluid within the bladder are exposed to the environment and are maintained at atmospheric pressure.

14. The sub-system of claim 9, further comprising an air scoop coupled to the expansion tank for removing entrained air from the first fluid.

15. A method of transferring heat from a refrigerant loop of a heating, ventilation, and air conditioning (HVAC) system to a heat exchanger of the HVAC system using a closed loop sub-system, the HVAC system includes first and second fluids, the sub-system includes an expansion tank and the heat exchanger includes a membrane, the membrane defines an inlet having an inlet height relative to grade, a level of the first fluid within the expansion tank has a level height relative to grade, the method comprising:
    channeling the first fluid from the membrane of the heat exchanger to the expansion tank;
    channeling the first fluid from the expansion tank to the membrane, the expansion tank is positioned relative to the heat exchanger such that the inlet height is greater than the level height and the membrane is maintained in a collapsed configuration; and
    exchanging heat from the first fluid to the second fluid using the membrane.

16. The method of claim 15 further comprising maintaining a pressure of the inlet of the membrane at a negative pressure.

17. The method of claim 15, wherein the sub-system further includes a condenser, and the method further comprises channeling the first fluid to the condenser and exchanging heat between the first fluid and a refrigerant using the condenser.

18. The method of claim 15 further comprising maintaining a pressure of the first fluid within the bladder at or near atmospheric pressure.

19. The method of claim 14 further comprising removing entrained air from the first fluid using an air scoop.

20. The method of claim 14 further comprising pumping the first fluid from the membrane to the expansion tank.

* * * * *